United States Patent [19]

Swensen et al.

[11] Patent Number: 5,730,448
[45] Date of Patent: Mar. 24, 1998

[54] SEAL RETAINER PLATE

[75] Inventors: Jeffrey E. Swensen; Terence J. Nolan, both of Eldersburg; J. Loyd Spence, Elkridge; John L. Beales, Jr., Hyattsville, all of Md.

[73] Assignee: EG&G Pressure Science, Inc., Beltsville, Md.

[21] Appl. No.: 778,632

[22] Filed: Jan. 3, 1997

[51] Int. Cl.⁶ .................................................. F16J 15/06
[52] U.S. Cl. ........................................ 277/630; 277/639
[58] Field of Search ........................ 277/1, 9, 11, 181, 277/183, 180, 189, 235 B

[56] References Cited

U.S. PATENT DOCUMENTS

| | | | |
|---|---|---|---|
| 2,339,478 | 1/1944 | Hoheisel | 277/180 |
| 2,795,444 | 6/1957 | Nenzell | 277/180 |
| 3,499,655 | 3/1970 | Czernik et al. | 277/235 B |
| 3,578,346 | 5/1971 | Jelinek | 277/180 |
| 3,857,572 | 12/1974 | Taylor et al. | 277/9.5 |
| 3,871,668 | 3/1975 | Coker et al. | 277/180 |
| 4,114,906 | 9/1978 | Jelinek | 277/180 |
| 4,348,032 | 9/1982 | Hanson et al. | 277/235 B |
| 4,648,607 | 3/1987 | Yamada | 277/9 |
| 4,813,691 | 3/1989 | Schoenborn | 277/235 B |
| 5,011,162 | 4/1991 | Jelinek | 277/11 |
| 5,145,190 | 9/1992 | Boardman | 277/235 B |
| 5,364,109 | 11/1994 | Sihon | 277/9 |
| 5,375,851 | 12/1994 | Mockenhaupt | 277/9 |
| 5,518,257 | 5/1996 | Breaker | 277/180 |
| 5,529,313 | 6/1996 | Malks | 277/11 |
| 5,564,714 | 10/1996 | Katsuno et al. | 277/181 |
| 5,580,065 | 12/1996 | Ueta | 277/180 |

OTHER PUBLICATIONS

Pressure Science Incorporated Catalog –"Tayor's Resilient Metallic Seals" –1981 –pp. 2,6 and 23.

*Primary Examiner*—Scott Cummings
*Attorney, Agent, or Firm*—Roylance, Abrams, Berdo & Goodman, L.L.P.

[57] ABSTRACT

A sealing assembly is disclosed for creating a seal between first and second mating members or components. The sealing assembly basically includes a seal retainer plate with one or more annular seals coupled thereto. The seal retainer plate includes a substantially flat rigid body portion with at least one resilient retaining element integrally formed therewith as a one-piece, unitary member for engaging and retaining the seal or seals thereto. Preferably, the seal retainer plate is constructed of a non-metallic material. The body portion of the retainer plate has a thickness relative to the axial dimension of the seal or seals for limiting axial compression of the seal or seals.

20 Claims, 4 Drawing Sheets

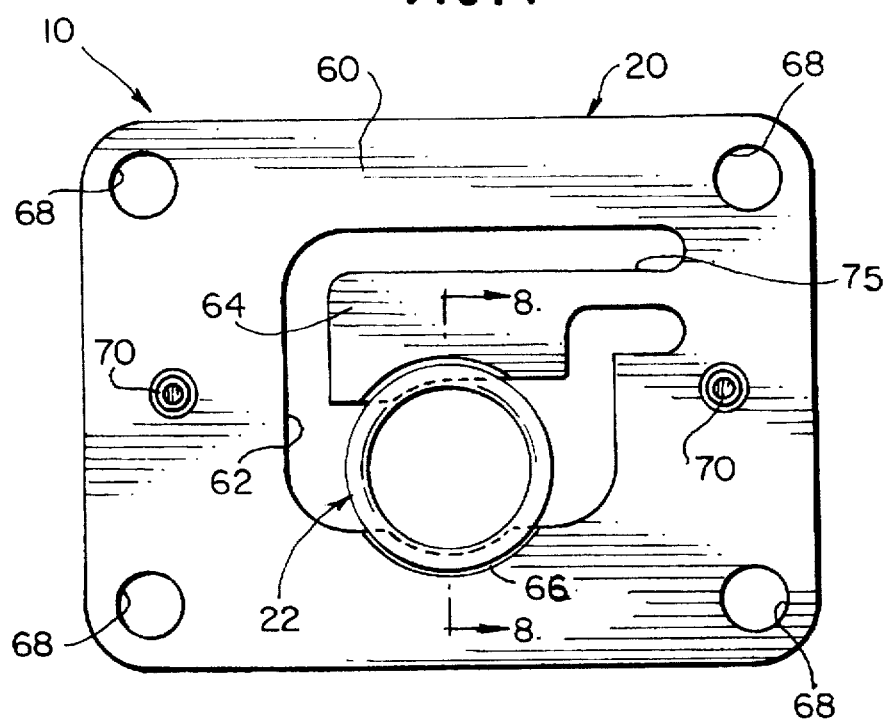
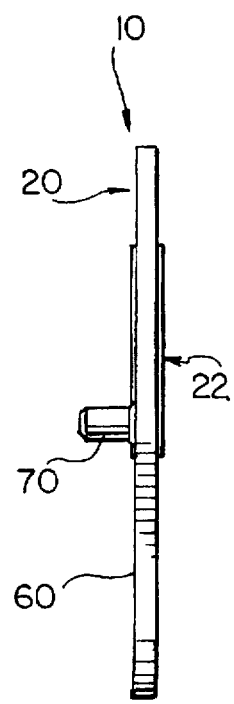
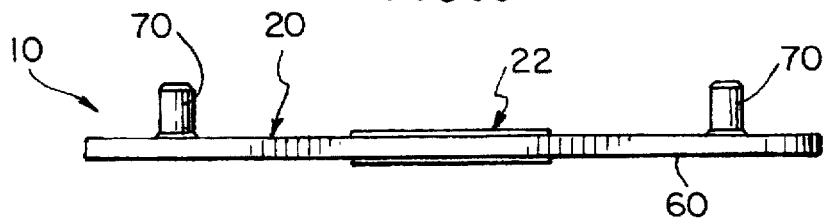

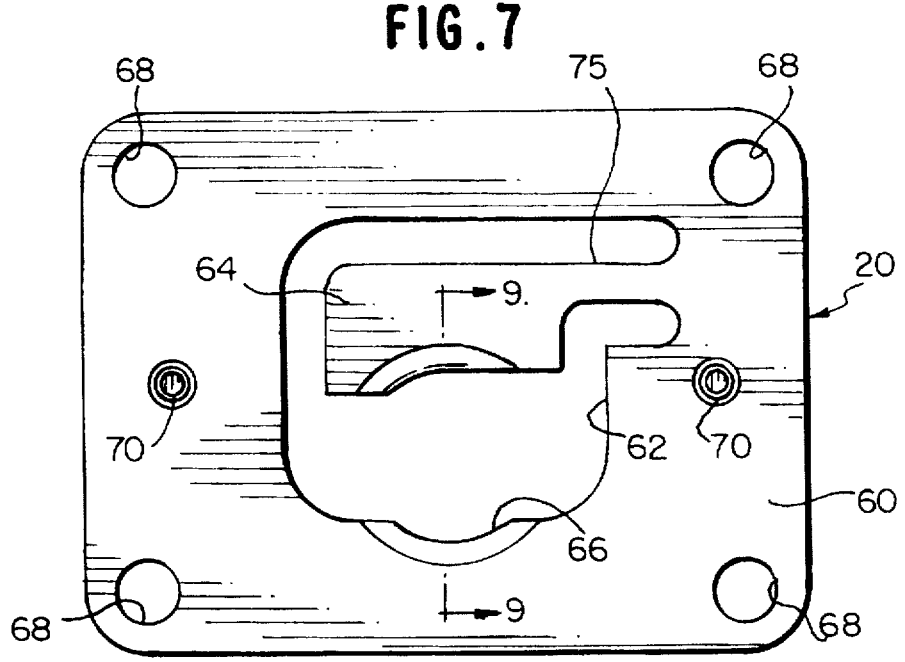
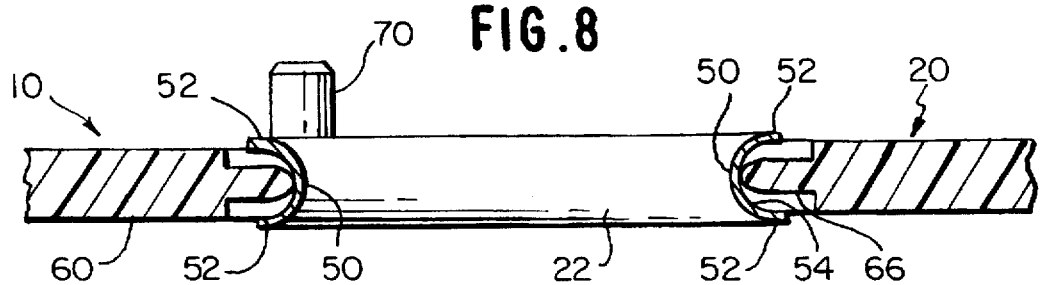
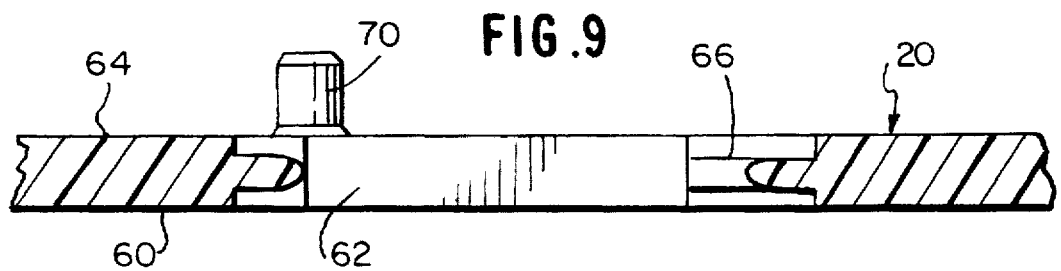

SEAL RETAINER PLATE

FIELD OF THE INVENTION

The present invention generally relates to a seal retainer plate which holds one or more seals. More specifically, the present invention relates to a seal retainer plate with a resilient retaining element integrally formed therewith for retaining and locating one or more seals between a pair of members or components with the orifice(s), port(s) or counterbore(s) to be sealed. The seal retainer plate is preferably constructed of a non-metallic material.

BACKGROUND OF THE INVENTION

Seals of various types and shapes have been employed to prevent fluid from escaping from a joint along a fluid flow path or in a fluid receptacle. Joints in the flow path or in a container are of course formed whenever two or more members or components are brought together to form a continuous conduit or a fluid receptacle. One common type of seal is a ring seal which is employed between members or components along the flow path, thus, preventing fluid from escaping between the two members. These two members or components often have grooves or counterbores formed therein to receive the ring seal and to form a seal gland.

These ring seals are resilient due to their material and their geometric shape so that the ring seal fills the gap between the adjacent members or components defining the flow path. The desired result is that the ring seal will firmly abut both members or components at all points along the seal so that the gap is completely blocked by the ring seal.

These ring seals can be installed in a variety of ways between the pair of members. The most common method is to merely place the ring seal in the groove or counterbore which forms the seal gland. However, in this method, the seal often moves or shifts during assembly of the two parts. Moreover, it is often difficult in certain applications to assemble the two parts together without the seal falling out of position. This causes the seal to be contaminated or damaged during installation.

It is also known that it is possible to use retainer plate plates for holding a seal in place to assist in the assembly. One example of a retainer plate is disclosed in U.S. Pat. No. 3,857,572 to Taylor et al. As seen in FIGS. 3 and 4 of the Taylor et al. patent, the ring seals are retained in openings of the retainer plate by a split wire ring which fits in a groove of the retainer plate and engages the outer surface of the ring seal. Also, the retainer plate of the Taylor et al. patent has holes for receiving bolts to secure the retainer plate to the members or components being coupled together.

While the retainer plate of the Taylor et al. patent is useful in certain applications, it may require special tooling to be used in certain circumstances. In particular, the retainer plate of the Taylor et al. patent is designed to be used with a pair of members or components which do not include a counterbore or groove for receiving the ring seal. Rather, the retainer plate of the Taylor et al. patent must have a thickness which permits the proper amount of inward deflection of the ring seal to insure proper sealing. Moreover, the retainer plate of the Taylor et al. patent is a multi-part retainer plate which can be more costly to manufacture.

Retainer plate plates are also known which, to retain the ring seals in place, utilize a friction type fit. For example, a retainer plate could be provided with a circular opening and the ring seal could be made slightly elliptical such that the ring seal is elastically deformed during insertion of the seal into the circular opening. One drawback of this type of retainer plate and seal assembly is that the ring seal typically must have a large diameter such that the elliptical shape can be easily deformed for insertion into the round opening of the retainer plate. Another drawback of this type of retainer plate and seal assembly is that it requires deformation of the seal which can result in the seal being contaminated or damaged during installation. Moreover, this type of retainer plate typically requires a substantially rigid plate with a substantial thickness such that the seal cannot be used with mating members or components having counterbores.

In view of the above, it is apparent to those skilled in the art that there exists a need in the art for a seal retainer plate which can be used with a pair of mating members or components with at least one of the members or components having a counterbore for receiving the ring seal. Moreover, there exists a need for an inexpensive seal retainer plate which can be relatively easily manufactured and installed. Moreover, there further exists a need for a seal retainer plate which permits seals to be installed between a pair of mating members or components without contact by hands or tools which could contaminate or damage the seal or seals. This invention addresses these needs in the art, as well as other needs which will become apparent to those skilled in the art once given this disclosure.

SUMMARY OF THE INVENTION

One object of the present invention is to provide a seal retainer plate which can be utilized with one or more highly reliable metallic seals to locate and retain the seal or seals with respect to orifice(s), port(s), or counterbore(s) to be sealed.

Another object of the present invention is to provide a seal retainer plate which can be used with one or more seals to retain the seal retainer plate to one of the mating members or components prior to coupling of the mating members or components together to prevent loss of the seal or seals in difficult assembly orientations.

Another object of the present invention is to provide a seal retainer plate which provides the installer with control of the seal or seals in inverted or vertical assembly situations.

Still another object of the present invention is to provide a seal retainer plate whereby the seal or seals can be installed without contact by hands or tools between the pair of mating members or components to avoid contamination or damage to the seal or seals.

Yet another object of the present invention is to provide a seal retainer plate that is relatively inexpensive to manufacture.

Another object of the present invention is to provide a seal retainer plate which provides thermal isolation between the components to be sealed.

Yet still another object of the present invention is to provide a seal retainer plate which is particularly useful with components having their sealing surfaces constructed of a relatively soft material.

Another object of the present invention is to provide a seal retainer plate which is relatively easy to install.

The foregoing objects are basically attained by providing a seal retainer plate for coupling at least one seal thereto, comprising a substantially flat, rigid body portion lying in a plane and with at least one seal receiving aperture; and at least one retaining element integrally formed with the body portion as a one-piece, unitary member, the retaining element being cantilevered from the body portion and extending inwardly into the seal receiving aperture to a free end for engaging the seal.

The foregoing objects are also attained by providing a sealing assembly for creating a seal between first and second members, comprising at least one annular seal with first and second longitudinally facing sealing surfaces and an outwardly facing cavity located between the first and second longitudinally facing sealing surfaces; and a seal retainer plate coupled to the at least one seal, the seal retainer plate including a substantially flat, rigid body portion lying in a plane with a seal receiving aperture formed therein, and at least one resilient retaining element integrally formed with the body portion as a one-piece, unitary member for engaging the cavity of the at least one seal to retain the at least one seal thereto the at least one resilient retaining element being cantilevered from the body portion and extending inwardly into the seal receiving aperture.

Other objects, advantages and salient features of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4 is a top plan view of the seal retainer plate illustrated in FIGS. 1–3 in accordance with the present invention, with the ring seal coupled thereto;

FIG. 5 is a side edge elevational view of the seal retainer plate illustrated in FIGS. 1–4, with the ring seal coupled thereto;

FIG. 6 is an end edge elevational view of the seal retainer plate illustrated in FIGS. 1–5, with the ring seal coupled thereto;

FIG. 7 is a top plan view of the seal retainer plate illustrated in FIGS. 1–6 in accordance with the present invention, without the ring seal coupled thereto;

FIG. 8 is a partial, enlarged transverse cross sectional view of the seal retainer plate and the ring seal coupled thereto as illustrated in FIGS. 1–7 and taken along section line 8—8 of FIG. 4; and FIG. 9 is a partial, enlarged transverse cross sectional view of the seal retainer plate illustrated in FIGS. 1–8 and taken along section line 9—9 of FIG. 7.

DETAILED DESCRIPTION OF THE PREFERRED EMBODIMENT

Figure 1:
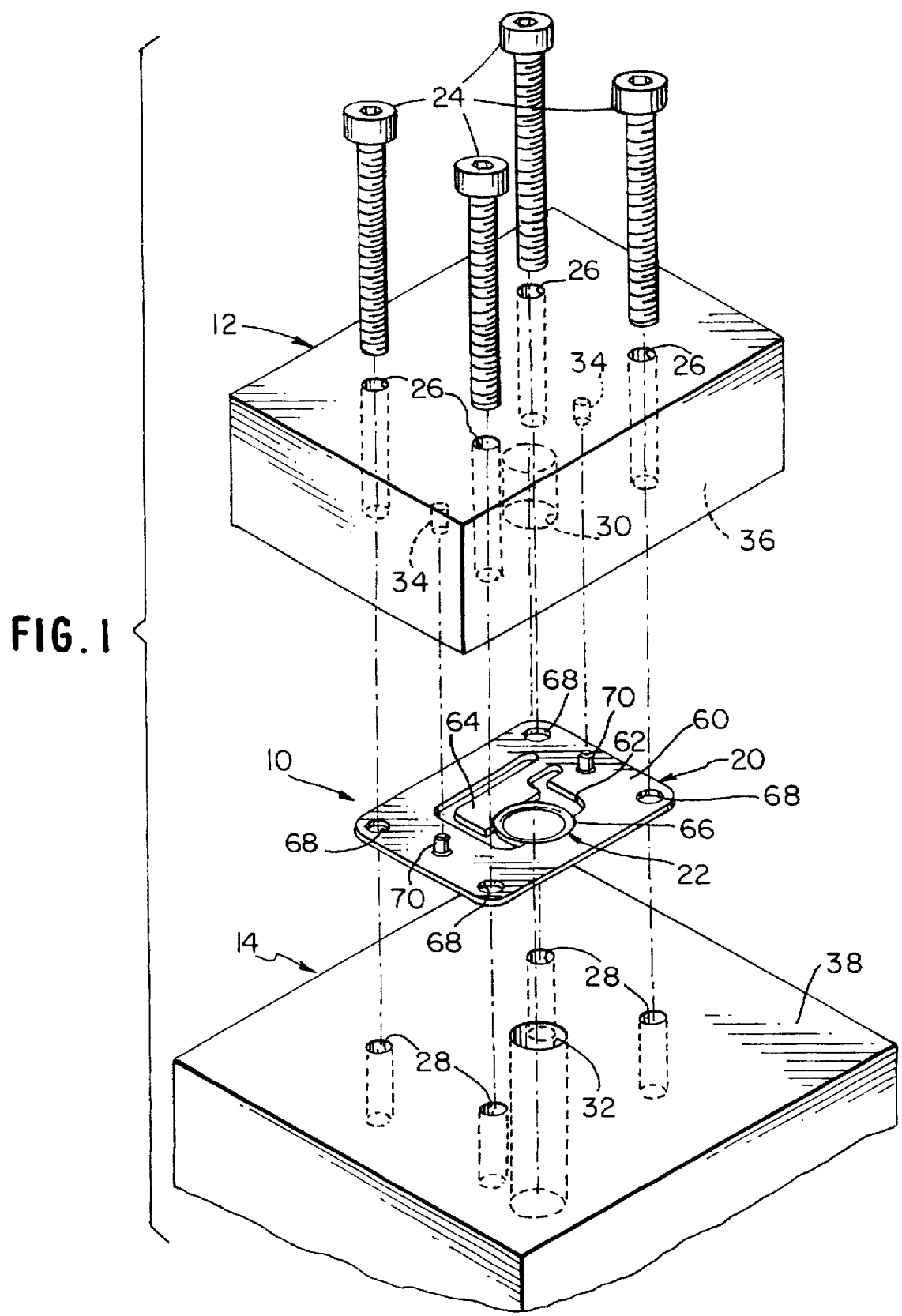
FIG. 1 is a partial exploded perspective view of a sealing assembly with a C-shaped ring seal coupled to a seal retainer plate in accordance with the present invention, and which is about to be compressed between a pair of mating members or components to create a seal therebetween.
Figure 2:
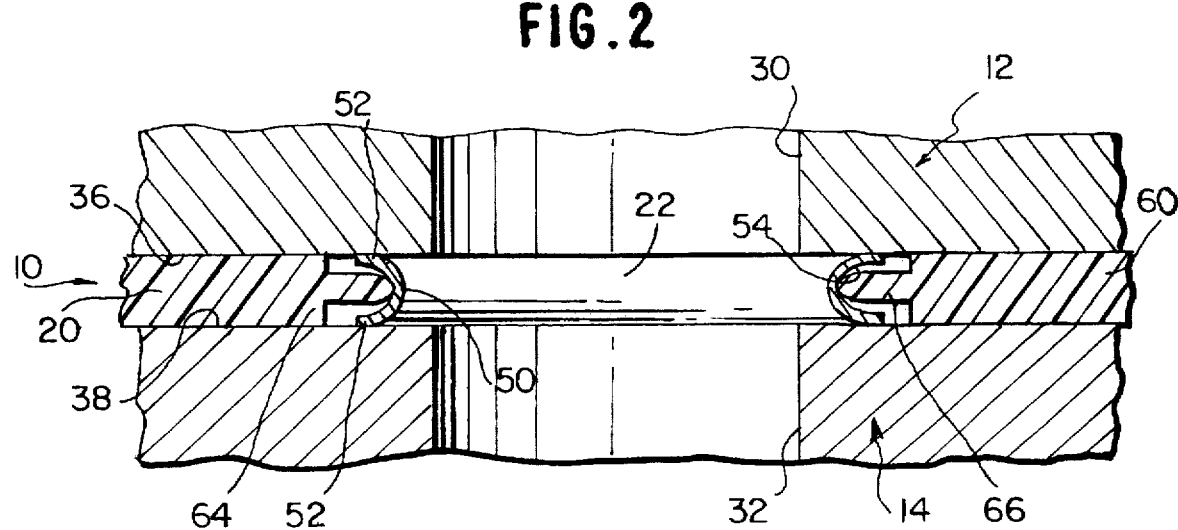
FIG. 2 is a partial, enlarged cross sectional view of sealing assembly illustrated in FIG. 1 after being coupled to the pair of mating members or components in accordance with the present invention.

Referring initially to FIGS. 1 and 2, a sealing assembly 10 in accordance with the present invention is illustrated prior to being coupled between a pair of mating members or components 12 and 14. Sealing assembly 10 basically includes a seal retainer plate 20 and a seal 22 coupled to seal retainer plate 20. Sealing assembly 10 is particularly designed for use with mating components 12 and 14 which do not have counterbores or recesses for seal 22. Of course, it will be apparent to those skilled in the art that sealing assembly 10 can be used with mating components with counterbores or recesses for seal 22 by reducing the thickness of retainer plate 20.

Sealing assembly 10 will only be described and illustrated with a diagrammatic illustration of mating members or components 12 and 14, since it will be readily apparent to those skilled in the art from this disclosure that the precise construction of the seal retainer plate 20, the number and locations of seals 22 will depend upon the particular application, as well as the particular structure of components 12 and 14.

Sealing assembly 10 is especially useful in the semiconductor process equipment and vacuum equipment industries or any other industries where high reliability and extremely tight sealing is required. In particular, sealing assembly 10 is preferably designed to provide a highly reliable seal. For example, sealing assembly 10 is preferably designed to pass a pressure test on the order of magnitude of $10^{-9}$ cc/sec helium.

In the example illustrated in FIGS. 1 and 2, component 12 is releasably coupled to component 14 via four bolts or fasteners 24 in a conventional manner. Of course, more or less bolts can be utilized depending upon the application. Component 12 can be, for example, a valve or regulator, while component 14 can be, for example, a manifold or base member. More specifically, component 12 has four bores 26 for slideably receiving fasteners 24 therethrough, while component 14 has four threaded bores 28 for threadedly receiving fasteners 24 therein, such that component 12 is releasably coupled to component 14 via fasteners 24.

Component 12 also preferably includes an orifice 30 which aligns with orifice 32 of component 14 when components 12 and 14 are coupled together. Component 12 further includes a pair of blind bores 34 for correctly positioning retainer plate 20 thereto as discussed below in more detail.

As seen in FIGS. 2 and 8, seal 22 is preferably a conventional ring seal, which has a C-shaped cross section with a bight portion 50 and a pair of curved leg portions 52. Of course, other types of annular seals could be used with other types of cross-sections. Moreover, seal 22 does not necessarily need to be round. Rather, seal retainer plate 20 can be modified to accommodate a wide variety of non-circular shapes. Bight portion 50 and leg portions 52 form an outwardly facing cavity or continuous groove 54. Each of the leg portions 52 of seal 22 has an annular sealing surface for engaging either face 36 of component 12 or face 38 of component 14.

Preferably, seal 22 is a metallic seal which is constructed of a suitable material such as stainless steel or INCONEL 718. Ring seals such as ring seal 22 are well known in the art, and thus, ring seal 22 will not be discussed or illustrated in detail herein. Rather, seal 22 will only be discussed and illustrated as necessary to understand the present invention. In the illustrated embodiments, seal 22 has an outer diameter of approximately 0.271 inch and an axial dimension of approximately 0.062 inch. Of course, seal retainer plate 20 can be constructed to accommodate one or more seals with other dimensions and/or shapes.

Seal retainer plate 20 basically includes a body portion 60 with a seal receiving aperture 62 formed therein, a first retaining element or spring arm 64 extending inwardly from body portion 60 into seal receiving aperture 62 and a second stationary retaining element 66 formed on the peripheral edge of seal receiving aperture 62. First and second retaining elements 64 and 66 each has a curved free end for forming a pocket to receive seal 22 therein as explained below.

Retainer plate 20 is preferably constructed of a relatively hard, but somewhat resilient non-metallic material such as a thermoplastic material such as Dupont's Rynite 530 which is a glass fiber reinforced resin. This type of material provides a high modulus and sufficient stiffness, such that excessive compression does not occur during tightening of fasteners 24. Of course, other suitable non-metallic and/or metallic materials, metals or alloys with the appropriate combination of properties can be used for forming retainer plate 20.

Additionally, the properties such as creep resistance and elongation are also important in selection of the appropriate material for retainer plate 20. The modulus of elasticity and elongation of the material of retainer plate 20 should allow sufficient deflection of the spring arm or retaining elements 64 without yielding or failure such that seal 22 can be installed into retainer plate 20 while maintaining the spring load required for centering the seal in seal receiving aperture 62.

Preferably, seal retainer plate 20 is injection molded to form seal receiving apertures 62, retaining elements 64 and 66, and mounting holes 68, and locating pins 70 utilizing conventional injection molding techniques. Alternatively, seal retainer plate 20 could be formed by other conventional manufacturing techniques.

Body portion 60 is also provided with four mounting holes 68 for receiving fasteners 24 therethrough and a pair of locating pins 70. Body portion 60 preferably is a substantially flat planar member which lies in a single plane and has a thickness of approximately 0.050 inch to approximately 0.052 inch for the dimensions of seal 22 as discussed above. Of course, the dimensions of body portion 60 will change depending upon the dimensions of the seal(s) to be used therewith. Accordingly, seal retainer plate 20 is slightly thinner than the axial or longitudinal dimension of seal 22 such that seal retainer plate 20 limits the compression of seal 22 between components 12 and 14. Of course, the thickness of body portion 60 depends upon the axial dimension of seal 22 as well as the desired amount of deflection of leg portions 52 of seal 22.

Retaining elements 64 are integrally formed with body portion 60 by injection molding of seal retainer plate 20 as a one-piece, unitary member, i.e., seal retainer plate 20 is constructed of a single piece of material.

Retaining elements 64 and 66 at least initially lie in the same plane as body portion 60. In particular, retaining elements 64 and 66 are integrally formed with body portion 60 and have curved free ends for engaging groove 54 of seal 22. Of course, it will be apparent to those skilled in the art that the free ends of retaining elements 64 and 66 can be V-shaped or can have other suitable shapes.

In this embodiment, seal retainer plate 20 is designed for coupling a single seal 22 thereto. Of course, seal retainer plate 20 can be constructed to accommodate additional seals as needed and/or desired. In the illustrated embodiment, seal 22 is coupled to body portion 60 by providing a single seal receiving aperture 62 in body portion 60 with the free ends of retaining elements 64 and 66 being arranged to lie at points on a circle for coupling seal 22 thereto.

It will be apparent to those skilled in the art from this disclosure that a pair of seal receiving apertures 62 could be utilized such that two different sets of retaining elements 64 and 66 are utilized to secure a pair of seals 22 to body portion 60.

Figure 3:
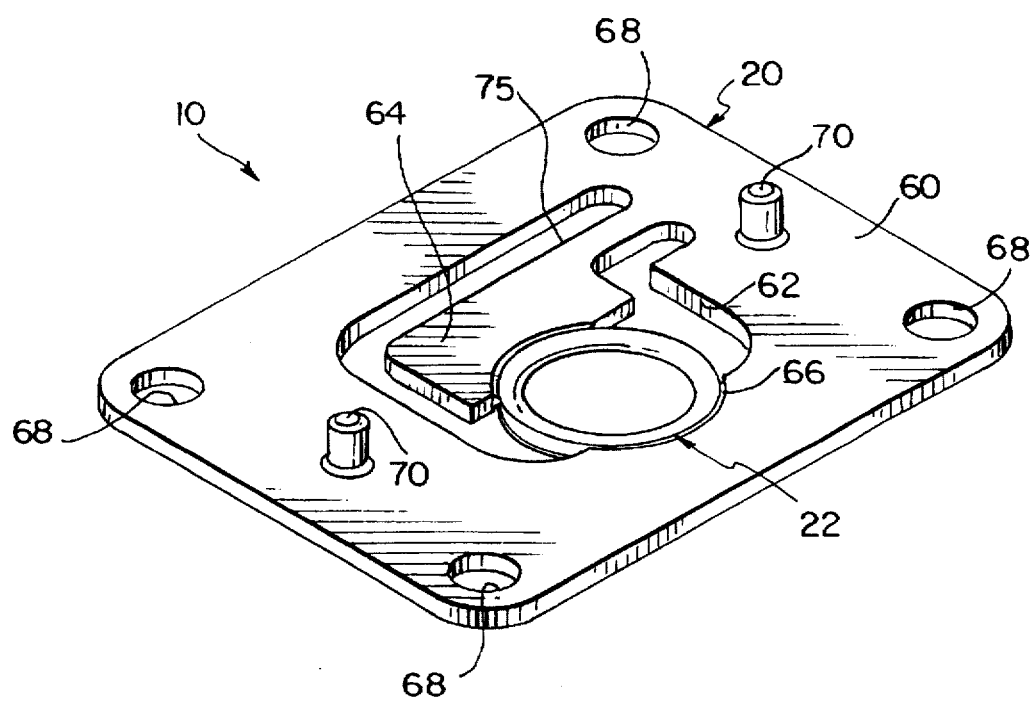
FIG. 3 is a perspective view of the seal retainer plate illustrated in FIGS. 1 and 2 in accordance with the present invention, with a ring seal coupled thereto.

Due to the relatively low resiliency of the material used to construct seal retainer plate 20, retaining element 64 is connected to body portion 60 by a connecting portion 75 as seen in FIGS. 3, 4 and 7. Connecting portion 75 provides retaining element 64 with sufficient resiliency such that retaining element 64 can be bent away from retaining element 65 within the plane of body portion 60 for securing seal 22 thereto.

In particular, seal 22 can be installed into seal receiving aperture 62 by angling the open side or bight portion 50 of seal 22 onto retaining element 66 on one side and bending retaining element so that the opposing retaining element 64 engages the open side of the C-section or bight portion 50 on the opposite side. The free ends of retaining elements 64 and 66 tightly engages bight portion 50 of seal 22 to firmly hold seal 22 in the correct position, as seen in FIGS. 2–4 and 8. Since the curved free end of retaining element 64 applies a load to seal 22, it is important to configure the free ends of retaining elements 64 and 66 so that seal 22 does not distort or move. Accordingly, the curved free end of retaining element 64 does not have the same center point as the curved free end of retaining element 66 in its unbiased position as seen in FIG. 7. In other words, retaining element 64 is configured such that it is slightly bent, when seal 22 is coupled thereto, and the curvature of its free end does not apply a force which tends to move seal 22 to the left as seen in FIG. 4. If no such radial correction were made to the curvature of the free end of retaining element 64, then seal 22 would tend to shift to the left as seen in FIG. 4, due to the "scissors action" of retaining elements 64 and 66.

While only one resilient retaining element 64 is utilized to engage and retain seal 22 against stationary retaining element 66, it will be apparent to those skilled in the art that a greater number of resilient retaining elements 64 could be utilized for securing seal 22 to body portion 60 if needed and/or desired.

Retaining element 64 should be constructed such that its free end is cantilevered relative to body portion 60 to allow independent deflection of retaining element 64 relative to the other stationary retaining element 66 for installation of seal 22 therebetween.

Moreover, it will be apparent to those skilled in the art from this disclosure that if more than one seal 22 is to be installed in the body portion 60 of seal retainer plate 20, that the number of spring arms or retaining elements 64 would be increased. Also it will be apparent to those skilled in the art that when seals 22 are closely spaced together, seals 22 may have one or more common retaining elements 64 supporting them to accommodate the additional seals more efficiently.

Moreover, it will be apparent to those skilled in the art from this disclosure that retaining elements 64 and 66 can have a wide variety of shapes for retaining seal 22 within seal receiving aperture 62. In any event, the important concept is that the resilient retaining element 64 engages the structure of seal 22 without interfering with the compression of seal 22 and that retaining element 64 has some resiliency to allow installation of seal 22 into retainer plate 20.

Regarding mounting holes 68, one or more of the mounting holes 68 can be configured to provide retention on the fastener or mounting bolts 24 after the fasteners 24 have been passed through bores 26 of component 12 which is to be coupled and sealed to the mating component 14.

Locating pins 70 are preferably integrally molded with body portion 60. Of course, pins 70 can be separate members which are attached to body portion 60. Preferably, pins 70 are sized to frictionally engage bores 34 in component 12 for retaining seal retainer plate 20 thereto. Pins 70 not only secure seal retainer plate 20 to component 14, they also ensure that seal 22 is properly positioned relative to components 12 and 14.

Installation of Sealing Assembly 10

As mentioned above, seal 22 is coupled to seal retainer plate 20 to properly locate seal 22 with respect to orifices 30 and 32 of components 12 and 14. This arrangement allows seal assembly 10 to be installed between components 12 and 14 without contact by hands or tools which could contaminate or damage seal 22.

Seal 22 is installed within seal receiving aperture 62 of body portion 60 via retaining elements 64 and 66. In particular, retaining element 64 can be deflected relative to body portion 60 so that the free end of retaining element 64 is received in the annular cavity or groove 54 of seal 22 for retaining seal 22 to body portion 60. As mentioned above, this can be done by angling one side of seal 22 such that retaining element 66 engages annular cavity or groove 54 of seal 22 and then bending retaining element 64 so that retaining element 64 can spring into the other side of cavity or groove 54 of seal 22 to capture seal 22 therebetween.

Once the sealing assembly 10 is complete, sealing assembly 10 is then coupled to one of the components 12 or 14. In this particular embodiment, sealing assembly 10 is retained to component 12 via bores 34 and locating pins 70. In particular, pins 70 are inserted into bores 34 of component 12 for retaining sealing assembly 10 thereto. In this position, seal 22 is correctly located since locating pins 70 not only retain sealing assembly 10 to component 12 but also ensures proper location of seals 22 relative to orifices 30 and 32 of components 12 and 14, respectively.

Next, components 12 and 14 are coupled together by fasteners 24. In particular, fasteners 24 are now threaded into threaded bores 28 of component 14. When fasteners 24 are tightened down, the annular sealing surfaces of leg portions 52 of seal 22 will engage face 36 of component 12 and face 38 of component 14 to create a seal therebetween. Moreover, seal 22 is compressed to ensure a fluid tight seal between components 12 and 14 about orifices 30 and 32.

In this particular configuration, body portion 60 has a predetermined thickness to control the amount of compression of seal 22. Accordingly, the dimensions, proportions and the overall thickness of seal retainer plate 20 are determined by the size of the seals and the available area under the mating components to be sealed. The overall concept can be applied to any number of seals, bolt patterns with any number of bolts and/or obvious variations.

Sealing assembly 10 is especially applicable to the semiconductor process and vacuum equipment industries, as well as other industries where high reliability and extremely tight sealing is required, e.g., a seal which passes a leakage test of $10^{-9}$ cc/sec helium. The sealing assembly 10 is also applicable for sealing location and retention whenever an externally pressurize seal configuration is suitable.

Other variations and/or modifications of the present invention includes retaining multiple seals of various numbers and arrangements, as well as accommodating various numbers and arrangements of fasteners. Moreover, the various thicknesses and types of sheet materials can be utilized to construct seal retainer plate 20 in accordance with the present invention. Moreover, while a circular ring seal 22 is illustrated, it will be apparent to those skilled in the art that non-circular configurations for seal 22 could also be utilized with minor modifications to the arrangement and orientation of retaining elements 64 and 66.

While only one embodiment has been chosen to illustrate the present invention, it will be understood by those skilled in the art from this disclosure that various changes and modifications can be made therein without departing from the scope of the invention as defined in the appended claims.

What is claimed is:

1. A seal retainer plate for coupling at least one seal thereto, comprising:

a substantially flat, rigid body portion lying in a plane and with at least one seal receiving aperture; and first and second retaining elements integrally formed with said body portion as a one-piece, unitary member, said first retaining element being cantilevered from said body portion and extending inwardly into said at least one seal receiving aperture to a free end for engaging the at least one seal, said first retaining element being resiliently movable relative to said second retaining element to engage a cavity of the at least one seal.

2. A seal retainer plate according to claim 1, wherein said body portion includes at least one mounting hole spaced from said at least one seal receiving aperture.

3. A seal retainer plate according to claim 2, wherein said body portion includes at least one locating pin which is shaped and sized for engaging and retaining said body portion to a member to be sealed.

4. A seal retainer plate according to claim 1, wherein said body portion and said first and second retaining element are constructed of a non-metallic material.

5. A seal retainer plate according to claim 1, wherein said second retaining element is a stationary retaining element with a free end adapted to engage the at least one seal.

6. A seal retainer plate according to claim 5, wherein said free ends of said retaining elements are curved and lie at points on a circle.

7. A seal retainer plate according to claim 6, wherein said free ends of said retaining elements are reduced in thickness relative to said body portion.

8. A seal retainer plate according to claim 6, wherein said free ends of said retaining elements are stepped down from exterior sides of said body portion.

9. A seal retainer plate according to claim 1, wherein said body portion includes locating and retaining means for coupling said body portion in a desired location.

10. A seal retainer plate according to claim 9, wherein said body portion includes at least one mounting hole.

11. A seal retainer plate for coupling at least one seal thereto, comprising:

a substantially flat, rigid body portion lying in a plane and with at least one seal receiving aperture; and at least one retaining element integrally formed with said body portion as a one-piece, unitary member, said at least one retaining element being cantilevered from said body portion and extending inwardly into said at least one seal receiving aperture to a free end for engaging the at least one seal, said body portion and said at least one retaining element being constructed of a material having a thickness ranging from approximately 0.050 inch to approximately 0.052 inch.

12. A sealing assembly for creating a seal between first and second members, comprising:

at least one annular seal with first and second longitudinally facing sealing surfaces and an outwardly facing cavity located between said first and second longitudinally facing sealing surfaces; and a seal retainer plate coupled to said at least one seal, said seal retainer plate including a substantially flat, rigid body portion lying in a plane with a seal receiving aperture formed therein, a first resilient retaining element integrally formed with said body portion as a one-piece, unitary member for engaging said cavity of said at least one seal to retain said at least one seal thereto, and a second retaining element spaced from said first retaining element, said first resilient retaining element being cantilevered from said body portion and extending inwardly into said seal receiving aperture for resiliently moving relative to said second retaining element to engage said cavity of said at least one seal.

13. A sealing assembly according to claim 12, wherein said cavity is a continuous, annular groove.

14. A sealing assembly according to claim 13, wherein said at least one seal is a circular ring seal.

15. A sealing assembly according to claim 12, wherein said body portion includes at least one locating pin which is shaped and sized for engaging and retaining said body portion to a member to be sealed.

16. A sealing assembly according to claim 12, wherein said body portion and said first and second retaining elements are constructed of a non-metallic material.

17. A sealing assembly according to claim 12, wherein said body portion includes at least one mounting hole spaced from said at least one seal receiving aperture.

18. A sealing assembly according to claim 12, wherein said first retaining element has a first free end, said free ends of said first retaining elements being curved and lying at points on a circle.

19. A sealing assembly according to claim 18, wherein said second retaining element has a second free end, each of said free ends of said first and second retaining elements lie at points on a first circle in said plane of said body portion.

20. A sealing assembly for creating a seal between first and second members, comprising:

at least one annular seal with first and second longitudinally facing sealing surfaces and an outwardly facing cavity located between said first and second longitudinally facing sealing surfaces; and a seal retainer plate coupled to said at least one seal, said seal retainer plate including a substantially flat, rigid body portion lying in a plane with a seal receiving aperture formed therein, and at least one resilient retaining element integrally formed with said body portion as a one-piece, unitary member for engaging said cavity of said at least one seal to retain said at least one seal thereto, said at least one resilient retaining element being cantilevered from said body portion and extending inwardly into said seal receiving aperture, said body portion and said at least one retaining element being constructed of a material having a thickness ranging from approximately 0.050 inch to approximately 0.052 inch.

\* \* \* \* \*